July 12, 1966  J. PAGE ETAL  3,260,635
PRODUCTION OF RIBBED BUILDING BOARD
Filed Aug. 22, 1963  7 Sheets-Sheet 1

July 12, 1966  J. PAGE ETAL  3,260,635
PRODUCTION OF RIBBED BUILDING BOARD
Filed Aug. 22, 1963  7 Sheets-Sheet 3

Inventors
John Page
Rupert J. Straub
Pendleton, Neuman
Seibold & Williams
Attorneys

July 12, 1966 J. PAGE ETAL 3,260,635
PRODUCTION OF RIBBED BUILDING BOARD
Filed Aug. 22, 1963 7 Sheets-Sheet 6

July 12, 1966  J. PAGE ETAL  3,260,635
PRODUCTION OF RIBBED BUILDING BOARD
Filed Aug. 22, 1963  7 Sheets-Sheet 7

Inventors
John Page
Rupert J. Straub
Pendleton, Neuman
Seibold & Williams
Attorneys United States Patent Office 3,260,635
Patented July 12, 1966

3,260,635
PRODUCTION OF RIBBED BUILDING BOARD
John Page, Glenview, and Rupert J. Straub, Lisle, Ill.,
assignors to United States Gypsum Company, Chicago,
Ill., a corporation of Illinois
Filed Aug. 22, 1963, Ser. No. 303,794
10 Claims. (Cl. 156—40)

This invention relates to a process and apparatus for constructing an improved gypsum building board or the like. More specifically, it relates to a process and apparatus which has rendered feasible for the first time the high-speed, low-cost manufacture of a novel ribbed building board having a gypsum core with paper faces, which process and apparatus successfully cope with problems associated with prior attempts at production of same.

Those skilled in the art have long sought a high-speed method and apparatus for inexpensively producing a gypsum-containing building board having longitudinal ribs on one side and a substantially smooth face on the opposite side suitable as a finished surface. Such boards may, for example, be secured individually to a supporting structure to provide a finished surface; or two of such boards may be cemented or otherwise secured together, preferably rib to rib, to form a building panel such as a non-load-bearing studless partition or the like.

Prior-art efforts have been largely unsuccessful because of the demanding process and apparatus requirements to achieve a successful structure of the type desired. For example, the face surface of such a structure must be substantially flat. The increased cross-sectional area at rib locations, however, often results in slight but unacceptable depressions on the face side coextensive with the ribs because of differential shrinkage during drying of the gypsum. Accordingly, any successful process or apparatus must cope with such difficulty.

Akin to the problem of depressions associated with differential shrinkage is the problem of unsightly depressions (or protrusions) associated with undersized (or oversized) ribs. For example, to secure an undersized rib to a supporting surface or to a mating ribbed building board, the finished surface thereof must be flexed inwardly coextensive with the undersized rib so that the rib can make contact. To avoid such problem, the production method and apparatus must insure that all ribs are substantially uniform in height as measured from the face side.

Moreover, the rib-side paper must have sufficient paper coextensive with the longitudinal rib locations to provide protruding envelopes for the ribs. Present-day, high-speed production techniques also require that such rib-side web be longitudinally fed in non-rectilinear directions during formation of the board. Because of the three-dimensional configuration of the rib-side web, however, a substantial change in direction would tend to cause tearing or distortion of the paper. A successful process and apparatus should therefore permit non-rectilinear paper travel without such tearing or distortion.

Another problem arises from the fact that the rib envelopes must be filled with the gypsum slurry when the slurry is substantially fluid. The ribs must also be shaped and gauged as to height while the gypsum slurry is still substantially plastic. Yet, the ribs, once formed, must not collapse or otherwise become misshapen. These conflicting requirements must also be met by any proposed process and apparatus.

Once the ribbed building board is complete, it must also be segmentable into desired lengths at high speed. Severing blades employed for such purposes with conventional, non-ribbed building boards would cause substantial and unacceptable damage to a ribbed structure. Accordingly, any proposed method and apparatus must permit the high-speed segmenting of a ribbed building structure without such disability.

In addition, the above and other requirements must be met by a method and apparatus which permits high-speed, high-volume continuous production of the product so that the ultimate installed cost is at least competitive with alternative constructions. Still further, the method and apparaus should also lend themselves to adoption without basic modification of present-day, continuous gypsum board production machinery, which represents a substantial proportion of the entire capital investment of the industry today.

These and other requirements are met by the process and apparatus of the present invention, as hereinafter described. In brief, the present process in one embodiment is an improvement on the conventional technique wherein a paper sheet is conveyed on a flat belt, calcined gypsum slurry is deposited thereon, and a cover sheet is added simultaneously with the passage of the assembly through a vertically-constricted passage, whereby a head of slurry is maintained just ahead of the passage. This conventional technique is modified in that the upper surface of the passage is constituted a contoured member which causes the cover sheet to assume a contour corresponding substantially thereto. The slurry is introduced between the sheets in sufficient volume to fill the contoured cover sheet, and the assembly so formed is maintained with the cover sheet upward facing at least until the slurry has become self-supporting.

After the slurry has become self-supporting and while still plastic, the assembly is passed through a second vertically-constricted passage. The vertical distance of the second vertically-constricted passage is slightly less than the maximum height of said contoured assembly, whereby rib height above the belt is gauged to a desired uniform value.

In a more specific embodiment of the process of the present invention, two continuous, elongated webs of paper are provided, one web being a face-side web and the other web being a rib-side web. The rib-side web while travelling longitudinally is subjected at transversely-spaced intervals to forces in a convergent direction whereby folds or pleats are progressively induced intermediate the spaced intervals, said pleats corresponding to desired rib locations. The rib-side web is then aligned from a convergent direction with, and in spaced relation opposed to, the face-side web with a fluid calcined gypsum slurry therebetween and in contact therewith. The fluid slurry is forced into the folded portions of the rib-side web to form a plurality of ribs, preferably under the influence of subatmospheric pressures exterior to the folded portions.

The resulting ribbed assembly is then flatly disposed with the rib-side web upward facing at least until the gypsum slurry obtains sufficient set to retain a flat face on face side. The ribs are shaped to the desired configuration while the gypsum slurry is still plastic and supported in such configuration until the slurry is substantially self-supporting. Rib height is also adjusted to a uniform distance from the face-side web while the gypsum slurry is still plastic but otherwise capable of retaining the distance so gauged.

These and other embodiments of the process will become apparent from the following detailed description of certain specific embodiments of apparatus for carrying out same presented in the accompanying drawings wherein.

Figures 1, 2:
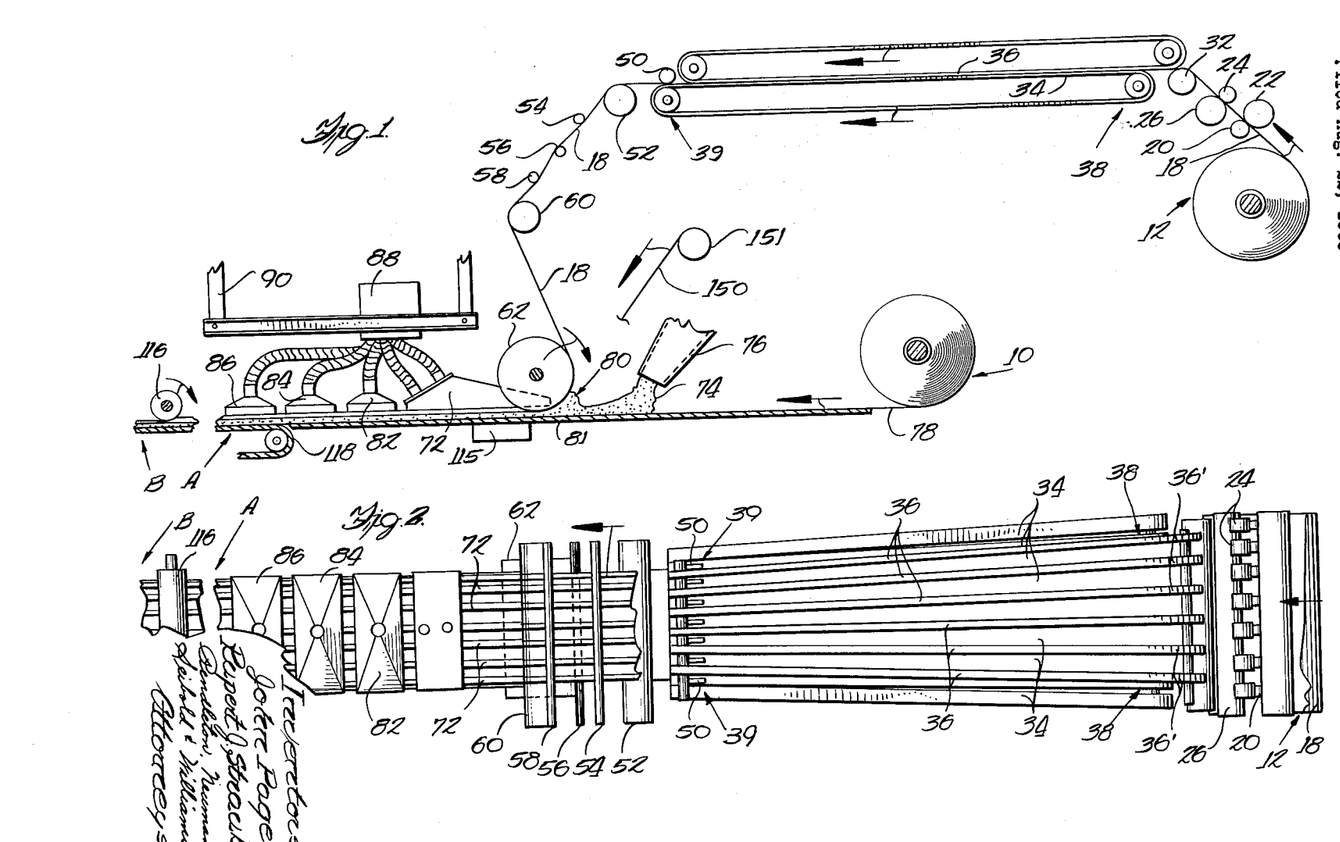
FIG. 1 is a diagrammatic side elevation view of an apparatus constructed in accordance with one embodiment of this invention.
FIG. 2 is a diagrammatic top plan view of portions of the apparatus shown in FIG. 1.

The apparatus of FIGS. 1 and 2 must of necessity be illustrated diagrammatically because of its extreme length. For example, the apparatus to the right of point A may alone occupy as much as 25 to 50 feet and the apparatus to the left of point A, including to the left of point B, the important details of which are illustrated in subsequent figures, may typically occupy 500 to 700 feet. Much of this length to the left of points A and B is made up, however, of a conventional flat-belt conveyor system, e.g., 400 to 500 feet, and roller conveyor system, e.g., 100 to 200 feet.

For orientation when reviewing the drawings, it should be kept in mind that (with the exception of FIG. 31) the process of manufacture commences at the right-hand side of the figure and the finished building board exits at the left-hand side. In keeping with the object of high-speed, high-volume continuous production, it should also be kept in mind that building board may be produced by the method and apparatus to be described in detail at the rate of 40 to 150 feet per minute.

Certain detailed aspects of the operation are not described or illustrated herein because such are the same as in conventional building board manufacture or are otherwise well within the skill of the art. A specific description thereof would merely burden the specification without adding anything to the knowledge of those skilled in the art. For example, no specific description is included herein as to the operation of folding the edges of the face-side paper so as to form with the rib-side paper an envelope for the fluid gypsum slurry. Techniques and apparatus for same are already well known.

Figure 3:
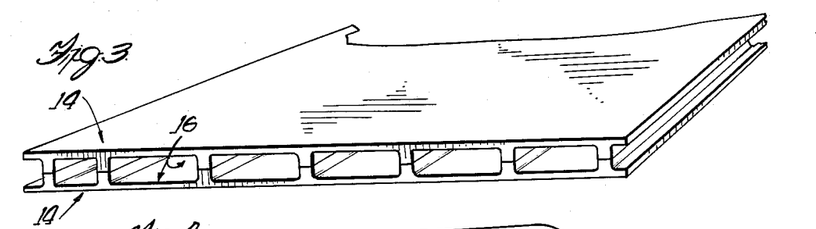
FIG. 3 is a perspective view illustrating a portion of a panel formed by cementing together two building boards of the type produced by the apparatus of FIGS. 1 and 2.
Figure 19:
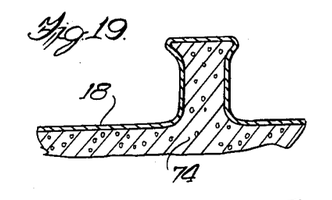
FIG. 19 illustrates a typical rib configuration after the shaping operation of FIGS. 16 and 17 and the gauging operation of FIG. 18.

The specific embodiment of the apparatus shown in FIGS. 1 and 2 is designed to produce building boards of the type used to form the panel of FIG. 3. For orientation and illustration (but not limitation), the building boards of FIG. 3 may, for example, have a length of 96 inches, a width of 48 inches and a thickness between ribs of ⅜ inch. Seven ribs may be present thereon, the center-lines of the seven ribs being located, respectively, 2½, 6½, 14½, 22½, 30½, 38½ and 46½ inches from the left-hand longitudinal edge. Each rib may have a height of ⅞ inch, as measured from the rear side of the board or 1¼ inches as measured from the face side. Thus, all of the outermost surfaces of the ribs lay in a common plane parallel to the plane of the face side of the board. The width of the ribs at the outermost surfaces may be about ¾ to 1¼ inches. At intermediate points in the rib cross-section, as is apparent, for example, in FIG. 19, the width of the ribs may be substantially less, e.g., ½ to ⅞ inch. As previously indicated, the aforementioned figures and dimensions are illustrative only of a typical building board, and the method and apparatus of the present invention are not limited to the production thereof.

Referring to FIGS. 1 and 2, two supply rolls of paper 10 and 12 are provided, the lower roll 10 being the source of the face-side paper web and the upper roll 12 being the source of the rib-side paper web. In the completed panel of FIG. 3, face-side paper is shown at 14 and rib-side paper is shown at 16.

The paper webs of supply rolls 10 and 12 may comprise conventional gypsum wallboard paper known to those in the art. Thus, for example, the paper of supply roll 10 may be conventional regular-strength or high-strength manila face paper, whereas the paper of supply roll 12 may be conventional news-lined rear-side paper. Other types of paper having the requisite strength, absorption, porosity and other required characteristics may also be employed, e.g., kraft back paper, the paper per se not being part of the present invention. In general, however, the face-side and rear-side paper should have a tensile strength in all directions no less than about 15 pounds per lineal inch, preferably no less than about 25 pounds per lineal inch.

The paper of supply roll 12 is wider than in conventional gypsum wallboard production in order to provide the additional paper required for the subsequent formation of rib envelopes therein. Accordingly, when forming a board having a finished width of approximately 48 inches and containing 7 ribs having a height of ⅞ inch each, such as illustrated in the panel of FIG. 3, the paper of roll 12 may initially have a width of approximately 60 inches.

Upon leaving roll 12, web 18 may be chamfered adjacent the edges, as in conventional practice, so as to provide a smooth mating surface when subsequently overlapped and adhered to the face-side paper. Web 18 then passes between two dead bars with edge guides (not shown) to position the paper on centerline.

Paper web 18 may then optionally pass between creaser roll 20 and hard rubber backup roll 22 and between creaser roll 24 and hard rubber backup roll 26. The purpose of the creaser rolls is to provide fold-prone lines longitudinally on the paper web to facilitate the subsequent folding of the paper into pleats and rib envelopes.

Figure 4:
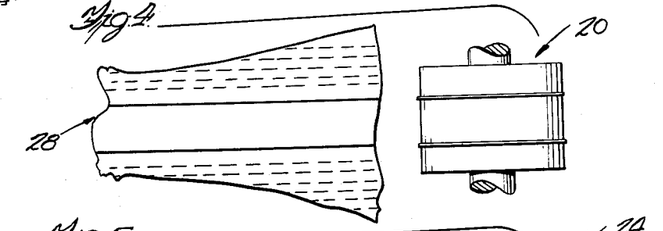
FIG. 4 illustrates a grooving roll as well as a portion of one side of the rib-side paper grooved thereby, said grooving roll optionally being employed in the apparatus of FIGS. 1 and 2.
Figure 5:
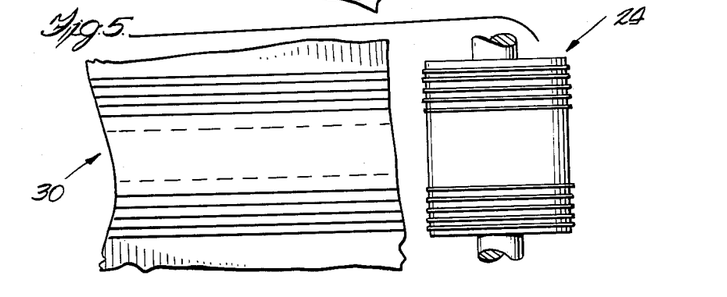
FIG. 5 illustrates another grooving roll and a portion of the other side of the rib-side paper grooved thereby, said grooving roll also optionally being employed in the apparatus of FIGS. 1 and 2.

Details of the creaser rolls 20 and 24 as well as the appearance of a fragment of web 18 after being creased by both rolls are illustrated in FIGS. 4 and 5. The creases resulting from creaser rolls 20 and 24 are on opposite sides of the rib-side paper, as shown by fragments 28 and 30, because of the opposite direction of subsequent folding when forming pleats and/or rib envelopes.

As one skilled in the art will recognize, it is important that the paper be kept substantially free of wrinkles to insure uniform spacing of creases. To this end, the paper is maintained in a plane as creaser rolls 20 and 24 push the sheet slightly into the resilient hard rubber backup rolls 22 and 26, respectively, and supplementary bars (not shown) are employed to hold the edges flat. Other alternative or supplementary devices such as cocked wheels or the like (not shown) may be employed if excessive wrinkling conditions are incurred.

Web 18 (optionally creased as above described) then passes over a convex surface 32, e.g., a bowed roller, and changes direction about 45°. Convex surface 32 may, for example, comprise seven cylindrical rollers, each having a diameter of 6 inches and a length of 9 inches and mounted side-by-side so as to form a substantially continuous surface having a "crown" at the center of approximately ½ inch. In short, the rollers are mounted so as to approximate a circular arc having a chord spaced therefrom at its center about ½ inch. Because the degree of convexity is so slight, it is not apparent in FIGS. 1 and 2. Convex surface 32 or the position of its "crown" relative to the tangential approach of paper web 18 is adjustable and is adjusted so as to induce a convergence in the paper exactly matching the gathering of the pleats as hereinafter described.

As it leaves bowed rollers 32, page web 18 is slightly "crowned," the extent thereof depending on the adjustment of convex surface 32; and the ensuing supporting surface 34 has a corresponding crown which progressively dissipates to a flat surface as the paper exits therefrom. Thus, supporting surface 34 follows the natural contour of the converging paper web as pleats are progressively formed therein.

Pleat formation in web 18 is accomplished by passing the web longitudinally between moving surfaces 34 and 36, said support surfaces having longitudinal spans of about 16 feet and 18 feet, respectively. As best shown in FIG. 2, support surfaces 34 and 36 comprise a series of spaced endless belts or chains with flat surfaces secured thereto. In one embodiment, as suggested at 36' (the right side of FIG. 2), the flat surfaces comprise a plurality of closely-spaced "Delrin" plastic platelets secured to each of the chains so as to form a longitudinally-continuous (although segmented) surface. In this embodiment the dimensions of the platelets of surface 34 are about 1½ inches in the direction of surface travel, 3½ inches transverse to the direction of surface travel, and about ⅛ inch thick. The corresponding dimensions for the platelets of surface 36 are about 1½, 4, and ⅛ inches, respectively, except in the case of the single narrow edge section shown at the top of FIG. 2, where the platelets are only about 2 inches transverse to the direction of surface travel.

At the right side, as viewed in FIG. 2, the endless belts or flat-top chains comprising support surface 34 are spaced substantially from one another as indicated at position 38. The spacing is progressively reduced so that at position 39 substantially no spacing exists and an "unbroken" transverse span results at the discharge end.

Upper surface 36 differs from surface 34 in that the individual longitudinal sections thereof are fewer in number and do not completely converge, thereby providing space for the pleats or rib envelopes which are induced in the paper web therebetween. It should be understood, however, that the top and bottom surfaces 34 and 36 preferably travel the same laterally-convergent paths having a common axis of convergence. To assure pleat formation between each section of surface 36 as the sections converge, the contacting surfaces thereof have a high coefficient of friction so as to securely grip the paper web. In a specific embodiment this is readily accomplished by cementing grit, sand paper, emery paper or the like to the smooth surfaces of the "Delrin" plastic platelets, e.g., "36-grit" Carborundum paper. Thus, as the sections of upper surface 36 converge toward one another, the portions of web 18 therebetween must fold or otherwise overlap. It is this action whereby the pleats are induced.

Figure 6:
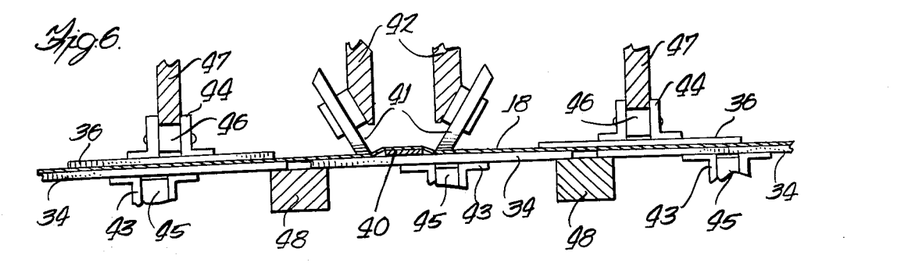
FIGS. 6, 7 and 8 are partial sectional views showing details of the apparatus of FIGS. 1 and 2 whereby pleats are induced in the rib-side paper, progressive steps in pleat formation being illustrated in said FIGS. 6–8.
Figure 7:
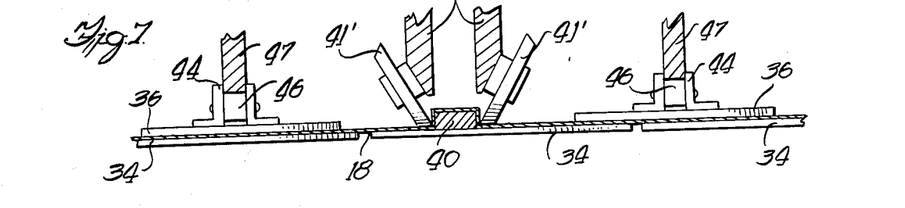
Figures 8, 9, 10, 18:
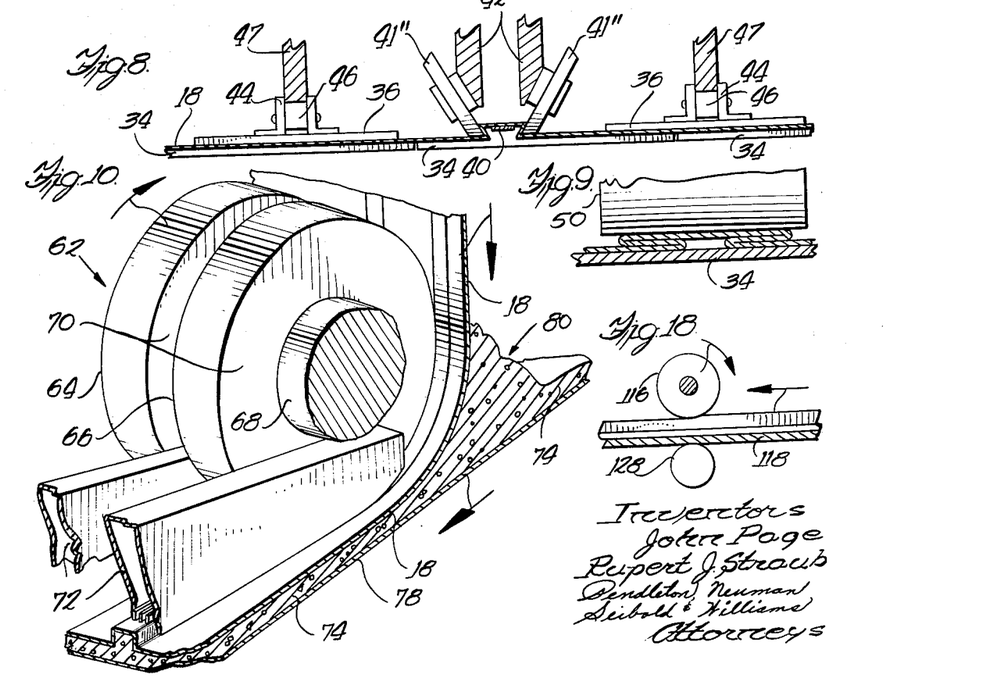
FIG. 9 is a blown-up view showing the flattening of the pleats formed as shown in FIGS. 6–8.
FIG. 10 is a perspective view, partly in section, of the master-forming roll and associated structures employed in the apparatus of FIGS. 1 and 2, whereby the flattened pleats of the rib-side paper are initially unfolded and filled with gypsum to form the ribbed board.
FIG. 18 is a diagrammatic view, partly in section, of the gauging roll of the apparatus of FIGS. 1 and 2 whereby rib height above the face side is gauged to a predetermined uniform value.

Proper pleat formation is controlled by means of pleat median strips 40 and a series of straddling rollers, e.g., 41, 41', 42", etc., on supports 42, 42', 42", etc., positioned between each longitudinal section of surface 36. These are illustrated in FIGS. 6, 7 and 8, which show in section progressive pleat formation. FIG. 6 is a section view of surfaces 34 and 36 adjacent the right extremity of FIGS. 1 and 2. FIG. 7 is a section view at a point approximately midway between the right and left extremities of surfaces 34 and 36. FIG. 8 is a similar view taken adjacent the left extremity of FIGS. 1 and 2.

In FIGS. 6, 7 and 8, the plastic platelets forming surfaces 34 and 36 are secured to connecting links 43 and 44, respectively, which are part of moving chains 45 and 46, respectively, chain guides for chains 46 being indicated at 47 and longitudinal support bars for the platelets of surface 34 being indicated at 48. It will be noted from a comparison of FIGS. 6, 7 and 8 that the sections of surface 34 progressively converge until the gap therebetween substantially disappears. At the same time, the sections gripping surface 36 also converge, the spacing therebetween being sufficient, however, to permit formation of the rib envelope.

The pleat median strips 40 are continuous contoured bars extending almost the entire length of surface 34 between the individual sections constituting surface 36. They have, for example, a height of $\frac{1}{16}$ inch initially, as shown in FIG. 6; a maximum height corresponding to the pleat fold at about mid-point in longitudinal travel, as shown in FIG. 7; and a final upraised thin portion just prior to the point of exit as shown in FIG. 8. The width of pleat median strip 40 from the lead or upstream end (FIG. 6) to the mid-point (FIG. 7) is as wide as the desired inside of the top of the pleat. From mid-point to the trailing or downstream end (FIG. 8), the width narrows slightly and the edges are relieved to allow the pleat to fold under its own flat top. Each pleat median strip 40 is anchored at the lead end only and "floats" on the lower surface 34.

Astraddle of pleat median strip 40 and spaced at periodic intervals, e.g., every 4½ to 5 inches, are the small rollers 41, 41', 41'', etc., e.g., tapered rollers having an average diameter of about 1½ inches. Such rollers are disposed and aligned so as to produce creases along the "neck" of the pleat, as indicated in FIGS. 6, 7 and 8. Where the paper has optionally been grooved to form fold-prone lines, the rollers would normally be aligned to follow the corresponding grooves. Thus, by careful positioning of the rollers, the pleat can be made to fold uniformly and evenly. Flatteners may be optionally spaced along the apparatus above the pleat median strips to keep the top of the pleat flat. Bars, rollers, rolling discs or the like (not shown) may, for example, be used.

At the discharge end, pleat-flattener rolls 50 (see FIGS. 1 and 2) are located to give the final flattened shape to each pleat. As illustrated in the magnified view of FIG. 9, the primary function of pleat-flattener rolls 50 is to flatten the pleats so that the pleated paper may subsequently travel in non-rectilinear directions without significant distortion. These rolls are typically rubber faced and may be adjustable so as to act as guide rolls as well as press or flattening rolls.

The outer edges of the sheet, which are not converged by top gripping surface 36 may be tucked under the pleat by using small cocked rubber training rollers (not shown). Alternatively, additional edge sections may be added to gripping surface 36 so as to form the pleats in the same manner as the intermediate pleats are formed in FIGS. 6, 7 and 8, the particular technique employed being a matter of design and/or cost expediency.

Paper web 18 with flattened pleats leaves the pleating and conveyor system formed by surfaces 34 and 36 and passes over concave surface 52, changing direction about 45° in so doing. Concave surface 52 may comprise a series of side-by-side rollers similar to those used to form convex surface 32, except that the concave portion thereof is tangential to paper web 18. The degree of concavity employed is adjustable and is adjusted so as to eliminate any convergent tendencies in web 18, whereby the web leaves concave surface 52 in a parallel stream.

In certain specific embodiments it is important to keep the tension in paper web 18 as it leaves the pleat-forming assembly substantially constant, e.g., about 130–170 pounds pull (spread over the 48-inch approximate width). Tension is readily maintained by, for example, using a drive on the pleater assembly, e.g., an "Adjustospede" electric motor, the speed of which is responsive to the force of the pleated paper against concave surface 52, and to incipient changes in the force. Accordingly, if tension starts to drop below the desired level, the speed of the pleater assembly is at least momentarily decreased, relative to the speed of the subsequent board-forming assembly, hereinafter described, until paper tension rises to desired level. Conversely, if paper tension starts to increase above desired levels, the speed of the pleater assembly is increased relative to the subsequent board-forming assembly until paper tension decreases to the desired level.

The traverse of pleated paper web 18 from the pleat-forming assembly to the board-forming assembly is made via lateral bars 54, 56 and 58 and web guide roll 60. Bars 54, 56 and 58 are disposed so that the path of paper web 18 is not changed more than about 5°. These bars help to maintain pleat integrity during traverse of the paper to the board-forming assembly. They may be supplemented by edge bars or the like (not shown) to prevent the outer pleats from spreading. Web guide roll 60 is used to position the pleated paper web 18 on master-forming roll 62, thereby assuring that the pleats are aligned with the recesses in forming roll 62, hereinafter described in detail.

As shown in FIG. 10, forming roll 62 comprises a plurality of individual cylindrical sections 64, 66, etc., mounted in spaced relationship on a rotatable shaft 68. Each of the pleats in paper web 18 is aligned with a recess in forming roll 62 such as illustrated at 70 in FIG. 10. The leading portions of vacuum manifolds 72 are inserted into recesses 70 to insure that the rib raises fully at this point.

The principle involved is that of forming the rib and filling it with gypsum where it is most readily accomplished. This is at the "nip" where the slurry head collects as on a conventional board machine. Accordingly, as calcined gypsum slurry 74 from source 76 is deposited on face-side web 78 from supply roll 10 a head of gypsum slurry 80 collects at the point of spaced convergence of rib-side web 18 and face-side web 78. As in conventional wallboard production, the vertical position of forming roll 62 above the machine table 81 normally gauges the volume of slurry introduced between the face and rear-side papers, other conditions being the same.

As shown in FIGS. 1 and 2, the ribs which are formed are supported or held up by vacuum means for the first 3 to 8 feet past the centerline of forming roll 62. These vacuum means include the aforementioned vacuum manifolds 72 and supplementary manifolds 82 and 84 and 86, all of which draw from a common vacuum source 88, which is supported from frame 90. The level of vacuum typically employed corresponds to at least about 20 inches of water, with a preferred vacuum level of at least about 40 inches of water, e.g., about 60 inches of water, and may range substantially higher, e.g., about 100 inches or more.

As indicated in FIGS. 1, 2 and 10, the first section of manifold 72 is located ahead of the forming roll centerline. It has been found that this first 6 inches or so of manifolding is of considerable importance in the rib forming operation. The subsequent vacuum manifolding is primarily necessary for rib support, rather than rib formation. Edge ribs in particular usually require this vacuum support, and in some embodiments the vacuum manifolds for the edge ribs may be extended beyond the manifolds for the intermediate ribs, e.g., an additional 2 or 4 feet.

Figure 11:
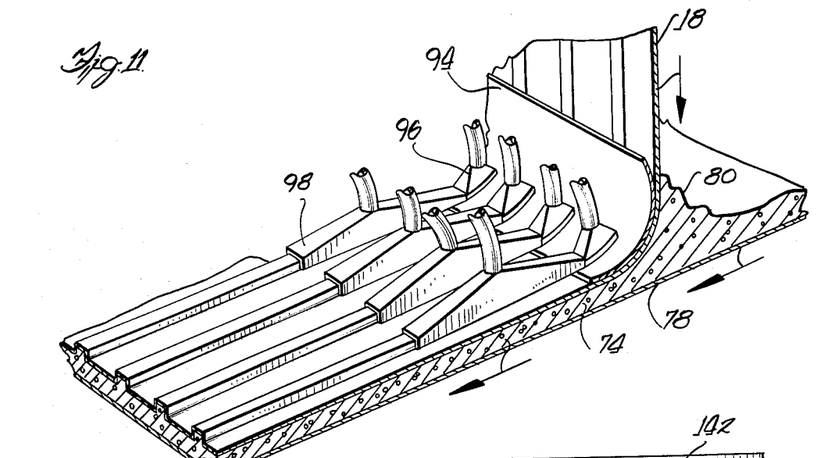
FIG. 11 is a similar perspective view, partly in section, of an alternate forming plate for initial rib formation, which plate and associated structures may be employed in place of the master-forming roll of FIG. 10.
Figure 12:
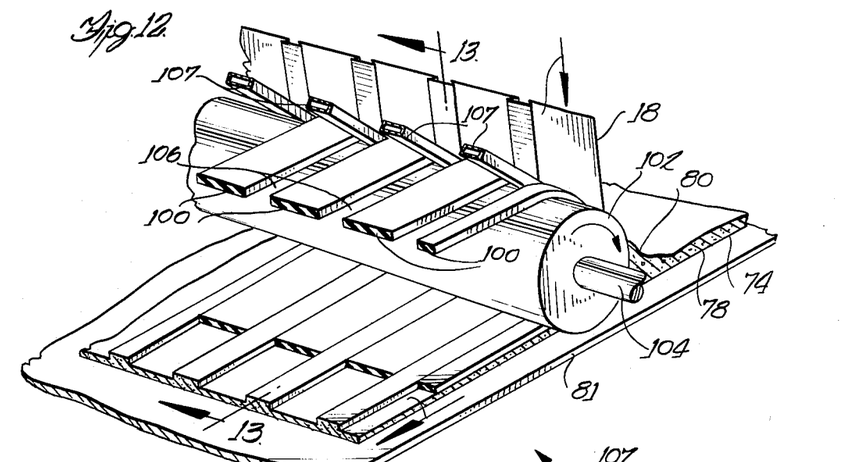
FIG. 12 is a similar perspective view, partly in section, of an alternate system employing a series of continuous belts for initial rib formation, which system may also be employed in place of the master-forming roll of FIG. 10.
Figure 13:
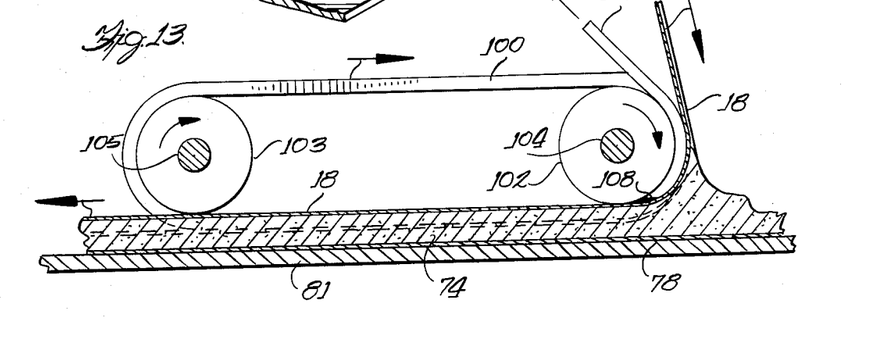
FIG. 13 is a view taken along section line 13—13 of FIG. 12.
Figure 14:
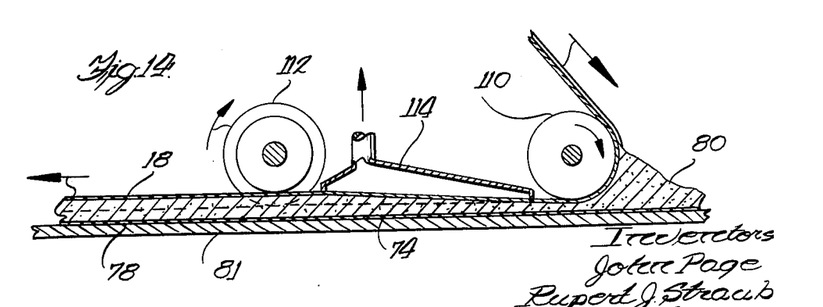
FIG. 14 is a section view of still another alternative system for initial rib formation wherein two rolls with intermediate vaccum means are employed, which system may also be employed in place of the master-forming roll of FIG. 10.
Figure 15:
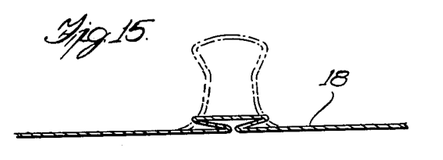
FIG. 15 illustrates by solid and dashed lines the unfolding of the pleated and flattened rib-side paper which occurs in the master-forming roll of FIG. 10, the forming plate of FIG. 11, or the alternate systems of FIGS. 12–14.

Functional equivalents for rib-forming roll 62 are shown in FIGS. 11 through 14. In FIG. 11 a forming plate 94 with recesses for vacuum manifolds 96 and 98 are substituted for forming roll 62. In FIGS. 12 and 13 a system of spaced continuous flexible belts 100 travel about rotatable cylinders 102 and 103 mounted on shafts 104 and 105, respectively, and thereby provide a contour surface containing recesses 106 into which vacuum probes 107 with nozzles 108 are inserted. The distance between shafts 104 and 105 may typically be about 2–10 feet or more, e.g., about 4½ feet. This embodiment has the advantage of readily providing positive support for the ribs for any desired distance. In FIG. 14 a combination of conventional cylindrical roll 110 and forming roll 112 (recessed at rib locations) with intermediate vacuum manifolding 114 is employed. In each embodiment the application of vacuum is employed to assist in opening flattened pleats to form rib envelopes, as indicated in dashed lines in FIG. 15, and to assist in filling the rib envelopes with calcined gypsum slurry. In addition, supplemental vacuum manifolding, such as manifold 98 in FIG. 11, may be employed to help support the resulting ribs.

It is also possible to form ribs by admitting the proper volume of slurry between a face-side paper and rib-side paper, which is preferably pleated, and then forcing the fluid slurry upward at rib location, while the slurry still retains a fluid character, by flattening the areas between desired ribs. While this method appears to be quite simple, it requires careful control and is not in fact as easily accomplished as in the methods already described wherein recessed surfaces with vacuum assistance are employed. These and other techniques for forming ribs are within the skill of the art in the light of the present disclosure.

As a supplement to or substitute for vacuum techniques for assuring rib formation, vibration techniques applied at or adjacent to the area of rib formation may also be used. For example, vibrator means 115 in FIG. 1 may be employed to apply vibratory pulses to table 81 and thereby to the fluid gypsum slurry and associated structures. In a typical installation, a conventional vibrator or pulsator having a frequency of, for example, 1000 to 50,000 cycles per minute, e.g., 10,000 cycles per minute, may be secured to the table immediately upstream, downstream or underneath the master-forming roll 62, preferably within 10 feet of the master-forming roll. Vibration techniques are very advantageously employed in connection with certain embodiments such as where the fluid gypsum slurry must pass through obstructions as represented by reinforcing webs, apertured rear-side paper, or the like, as hereinafter described.

While the rib structure is being formed as above described, the board is drawn over flat table 81 for a distance of, for example, about 2 to 12 feet past the master-forming roll, e.g., about 3 feet, to insure that there are no irregularities in thickness which might otherwise result from use of a conveyor belt system or the like at this critical point in board formation. Flattener plates (not shown) between the rib support manifolds 72, 82, 84 and 86 may also be employed. These flattener plates may be adjustable so as to provide control of between-rib thickness.

Gauging means (not shown) for tapering the longitudinal edges of the board may also be provided, as in conventional practice. For example, to compensate for the thickness of joint tape and cement used when adjoining boards are conventionally finished, a taper commencing at about 2⅛ inches to 2¼ inches in from the edge on the face side and resulting in a reduction in edge thickness of about 0.035 to 0.040 inch may be provided.

As previously indicated, the primary function of the rib-forming roll 62 and vacuum manifolding system represented by manifolds 72, 82, 84 and 86 is to expand the pleats into rib envelopes, to fill these rib envelopes with approximately the correct amount of calcined gypsum slurry, and to provide momentary support for the ribs once formed. Final rib shaping, however, occurs further downstream, e.g., between positions A and B shown in FIGS. 1 and 2, where the gypsum slurry has begun to set up but is still plastic. This is accomplished by means of a series of contour bars, as illustrated in FIGS. 16 and 17, and by rib-height gauging roll 116 as shown in FIGS. 1 and 2 and further illustrated in FIG. 18.

Figure 16:
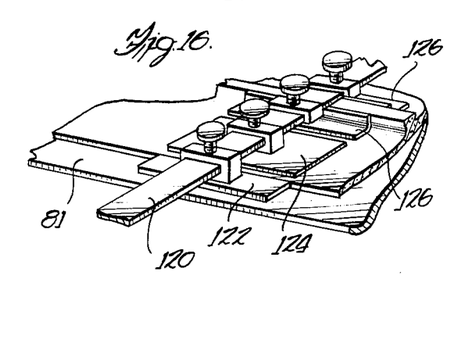
FIG. 16 is a perspective view, partly in section, showing a portion of one set of the contour bars used to shape and support the ribs formed as illustrated in FIGS. 10–14.
Figure 17:
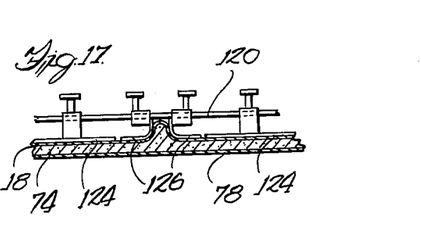
FIG. 17 is a transverse elevational view, partly in section, of another portion of the contour bars of FIG. 16.

Thus, as the rib structure leaves flat table 81, it is picked up by elongated conveyor belt 118, which is traversed at spaced intervals by a system of contour bars shown in FIGS. 16 and 17. In a typical embodiment three sets of contours are located at successively increasing intervals downstream from master-forming roll 62. The contour bars comprise a transverse supporting bar 120 on which is movably secured edge-support bars 122, between-rib flattening plates 124 and rib side-supports 126. As shown in FIG. 17, the top of the rib itself is somewhat rounded as it passes through the contour bars.

Several sets of such bars are employed because experience has shown that the rib structure tends to slump slightly or otherwise become somewhat misshapened for a substantial distance downstream of the master-forming rolls and the supporting vacuum manifolds. If such slumping were allowed to continue and correction thereof attempted in one single shaping step after sufficient set had been achieved, harmful stresses in the gypsum and paper would result, resulting in deleterious strains and inferior or unusable final products. The problem is highlighted by the fact that at this point in the over-all operation the covering paper is quite wet and thus comparatively weak. The stepwise correction of the slumping problem as it occurs by means of a series of contour bars at spaced longitudinal intervals avoids this difficulty.

As aforementioned, rib height is a critical consideration and must be substantially uniform as measured from the face side. In the present apparatus and method, uniformity is obtained by forming all ribs up to about ⅛ inch too high and then, while the gypsum is still plastic but otherwise self-supporting, flattening all of them to the same height by means of thickness gauging roll 116. Thus, as shown at the left side of FIG. 1 and on an enlarged scale in FIG. 18, rib height is purposely made excessive as it approaches the thickness gauging roll 116 but is correctly dimensioned after passing thereunder. To insure uniform gauging, backup roll 128 is disposed opposite the thickness gauging roll to prevent any sagging in supporting belt 118.

Side rollers (not shown) may optionally be employed to support the sides of the ribs as the ribs pass beneath thickness gauging roll 116. These rollers prevent the sides of the ribs from necking inward or othewise collapsing or fracturing as a result of the stresses resulting from the rib-height gauging operation. After the rib has passed beneath the thickness gauging roll, it has the desirable final contour shown in FIG. 19, including an enlarged flat contacting surface for adhesive bonding.

Figure 20:
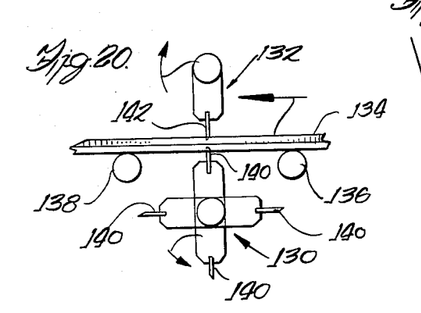
FIG. 20 is a diagrammatic view of the severing means of the apparatus of FIGS. 1 and 2, said severing being employed to segment the resulting ribbed building board.
Figure 21:
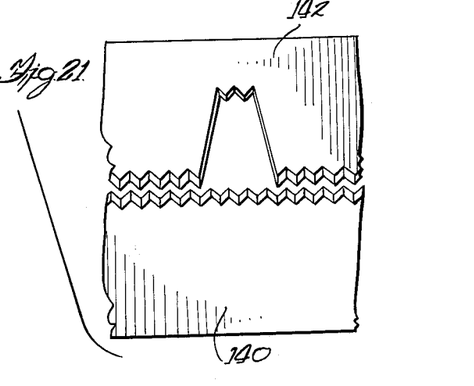
FIG. 21 is an enlarged view of a portion of the blades employed in the severing means of FIG. 20, the upper blade being notched or contoured at a rib location.

After the gypsum has substantially fully set, it may be transversely segmented into desired lengths by means of cutting apparatus such as illustrated in FIGS. 20 and 21. The rotational speeds of lower segmenting assembly 130 and upper segmenting assembly 132 are coordinated with each other and with the speed of the ribbed board 134, which is supported on rolling members 136 and 138, so that only minimum relative movement between the board and blades 140 and 142 occur as the blades penetrate the board.

The design of penetrating blades 140 and 142 has been found to be most critical. Blades 140 of lower assembly 130 may be of conventional saw-toothed design as shown in FIG. 21. Upper blade 142 must be contoured at rib locations as shown in FIG. 21. Otherwise rib smashing and other difficulties may be encountered.

In a specific example, blades 140 and 142 may be made from the best grade of Swedish wood band saw steel having a Rockwell hardness of C42 to C44 and a thickness of 0.0329 inch. There may be 5 canted teeth per inch, the tip to root distance being 0.150 inch. Where blade 142 is contoured at rib locations, the contoured portion may have a width of 0.80 inch at the lower extremity and a width of 0.40 inch at the upper extremity, the tip-to-tip vertical distance being about 0.85 inch. The dimensions in any particular case are, of course, a function of the rib configuration. In general, the operation of the segmenting assemblies and the shape or contour of the blades are designed so as to assure complete severance of the paper covering on both surfaces of the board, including the ribs. This normally requires that the blades penetrate at least to the root of the teeth and that the teeth of the upper and lower blades intermesh. Once the paper covering is severed, the gypsum, including that in the ribs, readily fractures without any substantial additional penetration by the blades.

Figures 22, 23, 24, 28, 29:
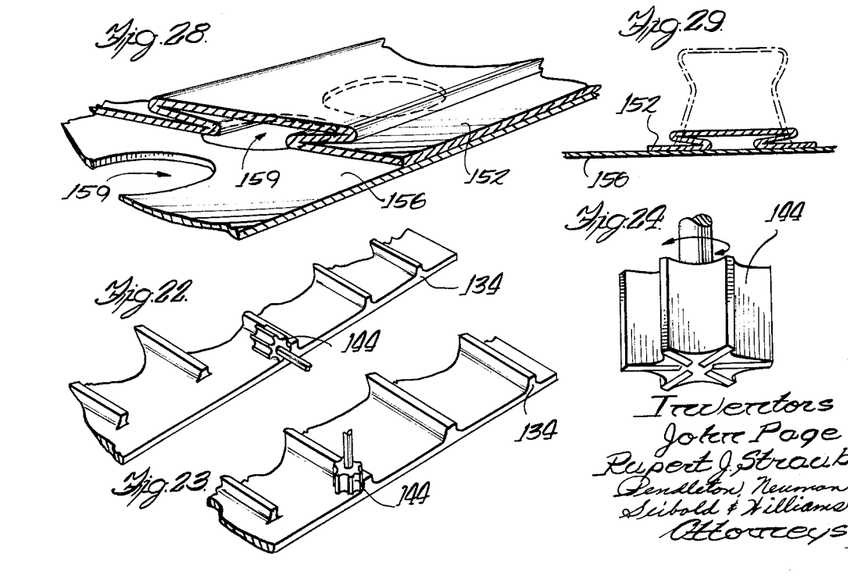
FIGS. 22 and 23 diagrammatically portray the step of routing, which is optionally employed in the apparatus of FIGS. 1 and 2 to remove rib portions adjacent the ends of the segmented building boards.
FIG. 24 shows a perspective view of the type of routing cutter which may be employed for rib-end removal, as shown in FIGS. 22 and 23.
FIG. 28 is a perspective view of a portion of the rib-side paper formed in the embodiment of FIGS. 26 and 27 showing the rib envelopes flattened.
FIG. 29 is a transverse sectional view thereof illustrating rib formation from the rib envelopes of the embodiment of FIGS. 26–28.

After segmenting the board, the extremities of the ribs may optionally be removed so as to provide recesses for supporting splines, installation plates or channels, or the like. Removal may be readily accomplished as indicated in FIGS. 22 and 23 wherein router 144, as illustrated in FIG. 24, is passed across the board at the extremity thereof. Accordingly, router 144 may be passed transversely adjacent the ends of the board, either with the router axis parallel to the ribs as shown in FIG. 22, or with the router axis perpendicular to the ribs as shown in FIG. 23. In a typical operation approximately 1⅝ inches of the rib extremities are removed at each end of the building board.

In an alternative embodiment, the routing of rib ends is accomplished prior to segmenting of the board. In such embodiment the router preferably removes approximately 3¼ inches of the rib, following which the board is segmented midway in the rib-free portion. This alternative embodiment has the advantages of reducing the number of routing operations and, in certain instances depending on relative clearances, permitting the use of conventional upper cutting blades, rather than the profile blade such as blade 142 of FIG. 21.

The routing operation should take place only when the paper cover is sufficiently dry to resist tearing resulting from the routing stresses. Accordingly, it is sometimes desirable to postpone the routing operation until after kiln drying of the board. Since kiln drying normally occurs after segmenting the board, routing prior to segmenting may be feasible only under special operating procedures.

Figure 25:
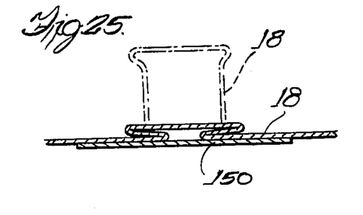
FIG. 25 illustrates an alternate construction which may be formed with the apparatus of FIGS. 1 and 2, wherein a strengthening web has been added at the base of the rib envelope, the unfolding of the latter being represented in dashed lines.
Figure 26:
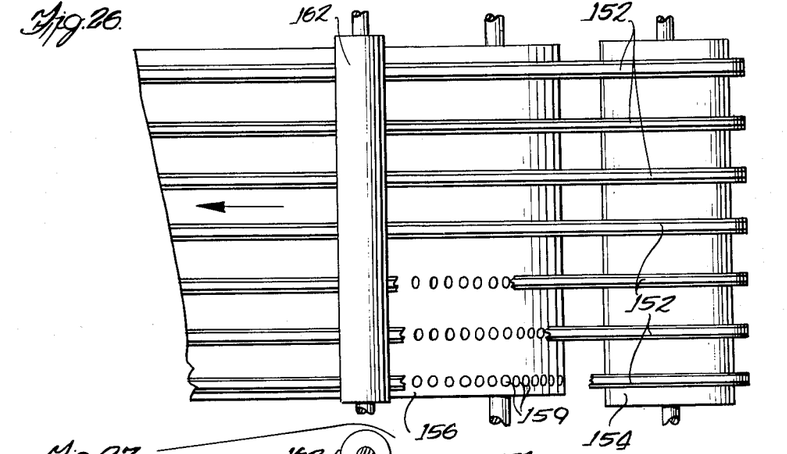
FIG. 26 is a diagrammatic top plan view of apparatus which may be substituted for that at the upper portion of FIG. 1 and may be employed in connection with another embodiment of the invention, wherein rib envelopes are individually adhered to apertured portions of unpleated rib-side paper.
Figure 27:
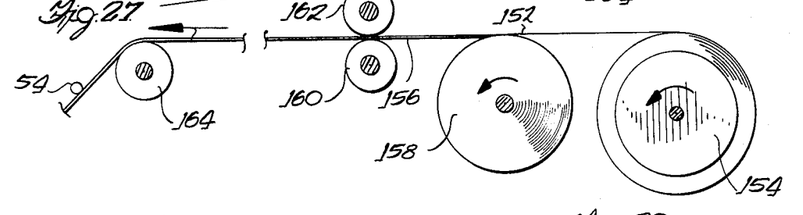
FIG. 27 is a diagrammatic side elevation view of the apparatus of FIG. 26.

In still another embodiment of the present invention, the juncture of the ribs with the rear side of the board, at least in the case of the edge-adjacent ribs, is reinforced by the addition of a reinforcing web 150 from supply source 151 (FIG. 1). This web may be added as illustrated in FIG. 1 by feeding same tangential to masterforming roll 62 at the various rib locations. The position of reinforcing web 150 relative to the pleated rib-side paper is illustrated in FIG. 25.

Such reinforcing web may take the form of an openlace-work of strands of a suitable material, e.g., natural or synthetic fibrous materials, such as various plastics, e.g., polyethylene, polypropylene, or the like; glass; rayon; Dacron; or equivalents thereof. The web may also comprise an apertured sheet material or fabric, e.g., paper, the various aforementioned natural and synthetic materials, and equivalents thereof.

In another embodiment the strengthening "web" might merely comprise individual spaced strands or strips of such materials transverse to the longitudinal direction of the ribs. Such unidirectional reinforcement is feasible because it is only in a lateral direction that the paper covering on the rib side does not provide substantial strengthening all across the board.

Where such strengthening webs are not adhered to the inside of the paper cover of the rear side, the shape, texture or nature of its surface thereof must be such as would hinder slippage through the set gypsum in which it is imbedded. Otherwise, the web would tend to slip and not absorb the tensile forces to which the structure might be subjected.

Whatever the strengthening means, it must be penetrable by a fluid slurry of calcined gypsum so as to provide a path for entry of same into the rib configuration during manufacture of the board. Such paths also assure partial continuity of the gypsum and minimize possible cleavage or slippage planes in the structure. As already indicated, the vibratory apparatus 115 shown in FIG. 1 may be employed to assure rapid passage of the gypsum through the web into the rib envelopes.

Still another embodiment of the present invention is illustrated in FIGS. 26 through 29. In this embodiment individual rib envelopes 152, which are pleated and flattened, are fed from supply roll 154 and are adhered to rear-side paper 156 from supply roll 158. Rear-side paper 156 is apertured coextensive with the desired rib locations, and the edges of the rib-side envelopes 152 are adhered adjacent the apertures 159 by means of suitable contact adhesives or the like. After passing between pressure rolls 160 and 162 and around direction-changing roll 164, the remaining portion of the process may be as indicated in the lower portion of FIG. 1, beginning with lateral bar 54.

In the embodiment of FIGS. 26 through 29 the paper webs intermediate apertures 159 in the rear side paper are in tension when the rear side of the board is convexly flexed laterally. The ability of the paper webs to absorb the tensile forces at the rib locations supplements the tensile strength of the gypsum.

The apertures 159 are for the same purpose as the openings in the reinforcing web of FIG. 25, i.e. to provide a path for flow of gypsum slurry into the rib envelopes during manufacture and to provide continuity to the gypsum structure without slippage or cleavage planes. The size of the openings is not critical so long as a gypsum slurry can rapidly flow therethrough. In practice, circular apertures of ¼-inch minimum diameter are preferred. Because of the strength-imparting function of the web and the need to avoid tearing thereof during manufacture of the board, the minimum cross-section of the web is normally not reduced to less than 20 percent of the total. Thus, for example, in the case of a web having circular apertures of 1-inch diameter, the inter-aperture web should be at least ¼ inch. The minimum-size inter-aperture web is, of course, a function of the inherent strength of the web material, higher strength paper, for example, permitting smaller webs.

Figure 30:
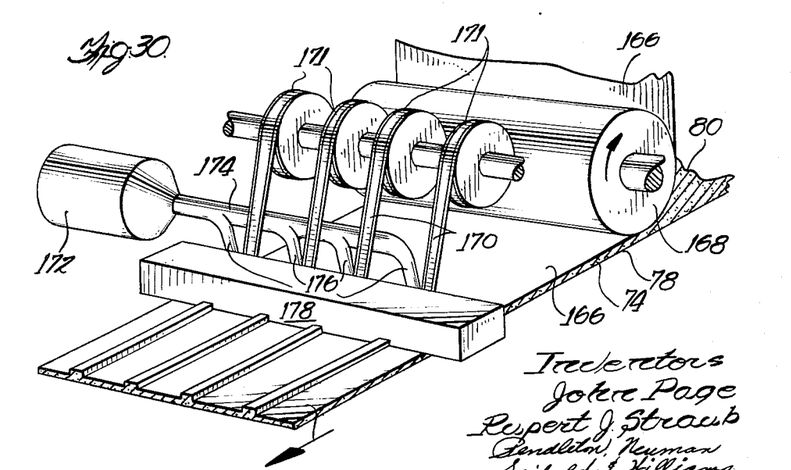
FIG. 30 is a diagrammatic perspective view of another embodiment of the invention similar to that of FIG. 26 except that the gypsum slurry is introduced into the individual rib envelopes directly rather than via apertures in the unpleated rib-side paper.
Figure 31:
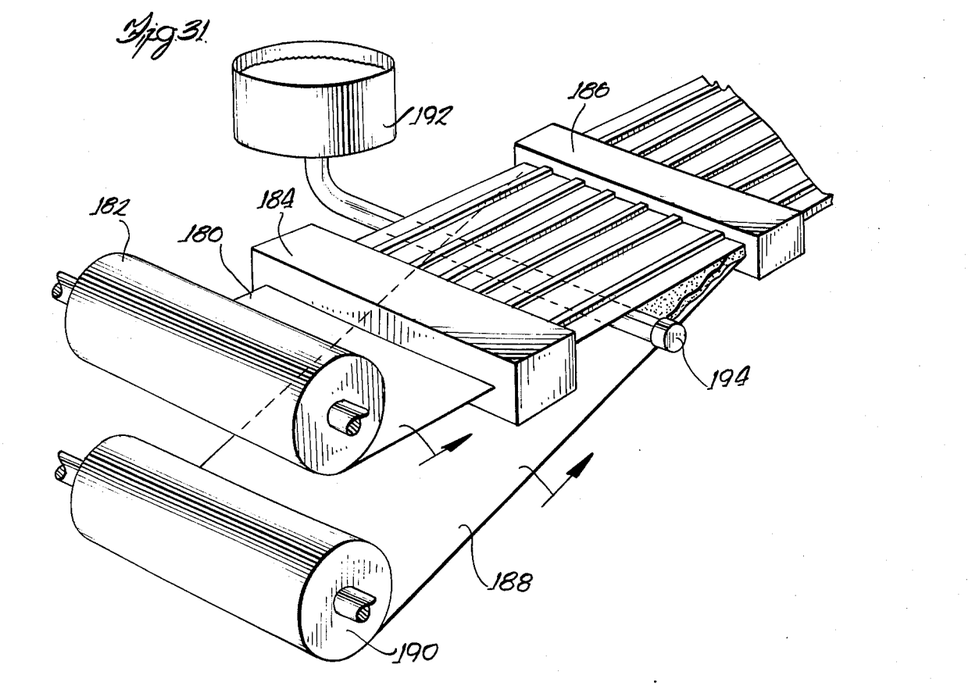
FIG. 31 is a diagrammatic perspective view of still another embodiment of the invention wherein the rib-side paper after formation of rib contours therein is fed "in-line" with the downstream supporting surfaces so that the ribs need not be temporarily flattened for purposes of non-rectilinear travel.

Still other embodiments of the present invention are schematically illustrated in FIGS. 30 and 31. In FIG. 30, conventional unpleated, unapertured rear-side paper 166 from a supply roll thereof (not shown) is fed via forming roll 168 in spaced relation from face-side paper 78, thereby initially forming what appears to be conventional gypsum wallboard. Rib envelopes 170 from supply rolls 171 are subsequently adhered to the rear side paper by, for example, conventional contact adhesive, a fluid gypsum slurry being injected into the rib envelopes as they are adhered to the rear side paper. Accordingly, a fluid gypsum slurry from supply source 172 is injected from gypsum manifold 174 into the rib envelopes 170 via nozzles 176. The remaining steps of the process and apparatus may then take the form of the embodiments already described or equivalents thereof, such being represented schematically in FIG. 30 for simplicity by zone 178.

In FIG. 31 the rear-side paper 180 is fed in line with the subsequent board-forming operation. Thus, the rib enevlopes need not be initially flattened in order to permit non-rectilinear travel. Accordingly, rib-side paper 180 from source 182 passes through rib envelope forming zone 184, which may take the general form of the first half of the rib pleater shown in the upper portion of FIG. 1, the first half point being shown in section in FIG. 7. Once the rib envelopes are properly formed, the paper may be fed directly (without flattening of the rib envelopes) in a straight line to board-forming zone 186 wherein it is aligned with face-side paper 188 from supply source 190, fluid gypsum slurry from source 192 being fed via distributor 194 therebetween. In short, in FIG. 31 the rib-side paper, not the face-side paper as shown in the other illustrated embodiments, is fed in alignment with the board subsequently to be produced. The face-side paper convergently joins it from below, non-rectilinear travel thereof not being a problem.

In all of the above described embodiments, the specific design of the apparatus is tailored in part to the assumed characteristics of the calcined gypsum slurry and/or vice versa. The calcined gypsum slurry is typically a cementitious slurry of calcium sulfate hemihydrate, water, starch, foam, fibers, set-accelerating reagents, etc., as is well known to those skilled in the art. The characteristics of the slurry may be varied considerably depending upon the particular formulation employed. Among the characteristics important to successful operation of the present method and apparatus are slump and set-time characteristics.

Slump is a rough measure of fluidity of the gypsum slurry; and it is apparent from the detailed description above that once the rib structure has been formed, the gypsum slurry must have sufficient resistance to flow so that the rib structure does not collapse completely when unsupported. The slump of the slurry is therefore carefully controlled by, for example, adjusting the amount of water in the formulation, so that the ribs, once formed, will resist collapse.

The slump characteristics of a particular formulation may be determined by taking a fresh sample of gypsum slurry as it is discharged from the slurry mixer and quickly pouring same into a clean, oiled 2-inch-diameter, 4-inch-high brass cylinder which is supported on a clean, dry, 6-inch square glass plate. After filling the cylinder, the slurry should be puddled with a spatula and the excess screeded off without dropping any on to the glass plate. The cylinder is then immediately raised straight up with a smooth rapid motion. The time elapsed between discharge of the gypsum from the mixer and raising of the cylinder should not exceed 10 seconds. The average diameter of the gypsum patty formed on the glass plate after the cylinder is raised provides a measure of slump. In practice, for example in the apparatus of FIGS. 1 and 2, it has been found necessary to control the slump so that the average diameter of the patty does not substantially exceed about 5 inches and is preferably less, e.g., not more than about 4½ inches.

Final set time may be considered for present purposes as the time required for the gypsum to assume substantially the dihydrate form although excess (free) moisture need not yet be removed. At final set the gypsum is, of course, no longer plastic and is characteristically hard. Final set time is of particular importance in the present method and apparatus because certain of the operations must be completed well before final set has occurred, whereas other operations must be completed substantially at or after final set. For example, the step of filling the rib envelopes with gypsum slurry, which might be termed the rib-filling step, must be completed when the gypsum slurry still retains some substantial degree of fluidity, i.e., within about 5 percent of the final set time, preferably within 3 percent of the final set time. The subsequent rib-shaping step, including rib contouring and rib-height gauging, must be completed while the gypsum still retains some substantial degree of plasticity, i.e., within about 40 percent of the final set time. Segmenting of the board should occur when the board is substantially fully set and thus hard or thereafter.

As a specific example, the embodiment of FIGS. 1 and 2 may employ a gypsum slurry 74 having a slump, as above determined, of about 4 inches and a final set time of about 5 minutes (300 seconds). The board is produced on the apparatus at the rate of about 100 feet per minute.

It is apparent that the rib-filling step carried out by master-forming roll 62 and vacuum manifold 72 is completed well within 3 percent (9 seconds) of the final set time, which corresponds to a board travel distance of about 15 feet. Three sets of contour bars as shown in FIG. 16 are located, respectively, at distances of 20 feet, 44 feet and 84 feet from master-forming roll 62. Gauging roll 116 is located 150 feet from master-forming roll 62, the distance between points A and B in FIG. 1 therefore approximating about 130 feet. Thus, it is also apparent that the rib-shaping step is completed well within 40 percent (120 seconds) of the final set time, which corresponds to a board travel distance of 200 feet. The segmenting assembly of FIG. 20 is located approximately 600 feet from the master-forming roll. It takes the board 6 minutes to reach this point; and with a final set time of 5 minutes, it is apparent that the gypsum is already fully set before the segmenting operation.

While shortening of the setting time could substantially decrease the length of the board line herein described, the setting time can not be cut too greatly because blistering problems often result. These and other considerations are well recognized by those skilled in the art.

While not specifically described herein, it should be understood that after segmenting the ribbed board, the board is dried in a kiln to remove excess (free) moisture. This operation is similar to the kiln-drying operation employed in the production of conventional wallboard. Because a ribbed board has a non-uniform cross-sectional area, however, special care must be taken to assure adequate drying without burning or calcining the board. Proper rib design is an important consideration in meeting such drying requirements. In the embodiment of FIGS. 1 and 2 the drying operation may be carried out, for example, for a period of 1 hour in a continuous, multi-layer kiln in which forced air is introduced at a temperature of about 500° F.

From the above description of the several specific embodiments, it is apparent that the objects of the present invention have been achieved. It should be understood, however, that while the method and apparatus of the present invention have been described with particular reference to these particular embodiments, such reference is merely illustrative, and the inventive concept is not necessarily limited thereto. For example, those skilled in the art will recognize that while the present method and apparatus are described herein in connection with the formation of a building board with ribs of certain suggested cross-sections, such method and apparatus may also be employed to form protrusions of other desired cross-sections; and the term "rib" used herein may be construed to encompass same. Many alternative modifications will be apparent from the above description to those skilled in the art. Such other alternatives are considered within the spirit and scope of the present invention, and coverage thereof is intended by this application.

Having described the invention, what is claimed is:

1. In a process of producing gypsum building board wherein a paper sheet is conveyed on a flat belt, calcined gypsum slurry is deposited thereon and a cover sheet is added simultaneously that the passage of the assembly through a vertically-constricted passage, whereby a head of slurry is maintained just ahead of said passage, the improvement which comprises
    (a) constituting the upper transverse limit of said passage a contoured member;
    (b) subjecting exterior portions of said cover sheet as it passes longitudinally through said passage to subatmospheric pressure to induce contours therein corresponding substantially to that of said member;
    (c) introducing slurry between said sheets in sufficient volume to fill between-sheet spaces including the contours; and
    (d) maintaining the assembly so formed with cover sheet upward-facing at least until said slurry has become substantially self-supporting.

2. The process of claim 1 including the further improvement wherein said assembly is passed, while said slurry is self-supporting, yet still plastic, through a second vertically-constricted passage, the vertical distance being slightly less than the maximum height of said contoured assembly, whereby said assembly is accurately gauged to a predetermined height.

3. The process of claim 1 including the further improvement of subjecting said slurry to vibratory action to induce filling of between-sheet spaces including the contours with said slurry.

4. A process for manufacturing ribbed building board comprising in combination the steps of:
   (a) providing at least two continuous, elongated webs of paper each having parallel edges, the lower web being a face-side web, the upper web being a rib-side web and having longitudinal folds therein corresponding to desired locations of a plurality of ribs;
   (b) aligning said rib-side web with, and above the face-side web with a fluid gypsum slurry therebetween and in contact therewith;
   (c) forming said longitudinal folds into rib configurations and forcing fluid gypsum slurry thereinto while subjecting exterior portions of the folds to a pressure less than in the interior thereof so as to form a plurality of ribs;
   (d) maintaining said face-side web flatly disposed and said rib-side web upwardly disposed at least until the gypsum slurry obtains sufficient set to retain a flat face on the face side;
   (e) shaping rib contours and adjusting rib height to a predetermined uniform distance from the face-side web while the gypsum slurry is still plastic; and
   (f) severing the resulting ribbed building board at spaced transverse intervals;
whereby a plurality of ribbed building boards having a face side suitable as a finished surface for decorative treatment is formed.

5. The process of claim 4 including the step of providing slurry-penetrable reinforcing webs between said face-side web and said rib-side web adjacent and coextensive with desired locations of a plurality of ribs and wherein the fluid gypsum slurry is forced through the reinforcing web to enter said longitudinal folds to form a plurality of ribs.

6. The process of claim 4 including the step of tapering longitudinal margins of the face side of the board while the gypsum slurry is still plastic, 7. The process of claim 4 including the step of removing sections of the ribs so formed adjacent said spaced transverse intervals.

8. A process for manufacturing ribbed building board comprising in combination the step of:
   (a) providing at least two continuous, elongated webs of paper each having parallel edges, one web being a face-side web, the other web being a rib-side web;
   (b) subjecting the rib-side web at spaced intervals to forces in a convergent direction whereby folds are progressively induced intermediate said spaced intervals;
   (c) aligning from a convergent direction the folded rib-side web with, and in spaced relation opposed to, the face-side web with a fluid calcined gypsum slurry therebetween and in contact therewith;
   (d) subjecting exterior surfaces of the folded portions of the rib-side web to subatmospheric pressures so as to induce the unfolding thereof to form rib envelopes;
   (e) forcing the fluid calcined gypsum slurry into the unfolding folded portions of the rib-side web to from a plurality of gypsum-filled ribs;
   (f) flatly disposing said face-side web with said rib-side web upwardly disposed at least until the gypsum slurry obtains sufficient set to retain a flat face on the face side; and
   (g) shaping the ribs so formed and adjusting rib height while the gypsum slurry is still plastic to a uniform distance from the face-side web;
whereby a ribbed building board or the like having a face side suitable as a finished surface for decorative treatment is formed.

9. A process for manufacturing ribbed building board comprising in combination the steps of:
   (a) providing at least two continuous, elongated webs of paper each having parallel edges, one web being a face-side web, the other web being a rib-side web;
   (b) subjecting the rib-side web at spaced transverse intervals to forces in a convergent direction whereby longitudinal pleats are progressively induced intermediate said spaced transverse intervals;
   (c) flattening the pleats so formed;
   (d) changing the direction of travel of the web while the pleats are so flattened;
   (e) aligning from a convergent direction the rib-side web above, and in spaced relation opposed to, the face-side web with a fluid calcined gypsum slurry therebetween and in contact therewith;
   (f) introducing said gypsum slurry into the pleats under the influence of a pressure greater than that exterior of the pleats whereby the pleats are at least partially unfolded and longitudinal ribs are established;
   (g) flatly disposing said face-side web with said rib-side web upwardly disposed until at least the gypsum slurry obtains sufficient set to retain a flat surface on the face side;
   (h) shaping the ribs and adjusting rib height to a uniform distance from the face-side web while the gypsum slurry is self-supporting but still plastic; and
   (i) severing the resulting ribbed building board or the like at space transverse intervals;
whereby a plurality of ribbed building board or the like having a face side suitable as a finished surface for decorative treatment is formed.

10. A process for manufacturing ribbed building board comprising in combination the steps of:
   (a) providing a first elongated web of paper having parallel edges, herein termed the face-side web;
   (b) providing a second elongated web of paper having parallel edges, herein termed the rib-side web, said rib-side web having a plurality of slurry-penetrable apertures coextensive with desired rib locations and having paper strips correspondable to rib configurations adhered to the rib-side web so as to envelop said slurry-penetrable apertures;
   (c) aligning said rib-side web with and in spaced relation opposed to the face-side web with a fluid gypsum slurry therebetween and in contact therewith;
   (d) forcing the gypsum slurry through the apertures in said rib-side web and into the paper strips enveloping same under the influence of subatmospheric pressure exterior of the paper strips so as to form a plurality of ribs;
   (e) flatly disposing said face-side web with said rib-side web upwardly disposed at least until the gypsum slurry therebetween obtains sufficient set to retain a flat surface on the face side; and
   (f) adjusting rib height to a uniform distance from the face-side web while the gypsum slurry is self-supporting but still plastic;
whereby a ribbed building board or the like having a face side suitable as a finished surface for decorative treatment is formed.

References Cited by the Examiner
UNITED STATES PATENTS

| | | | |
|---|---|---|---|
| 1,308,724 | 7/1919 | Schumacher | 156—42 |
| 1,353,510 | 9/1920 | Baumgartl | 156—42 |
| 1,493,899 | 5/1924 | Routt | 156—347 |
| 1,561,520 | 11/1925 | Mortensen | 161—114 X |
| 1,887,758 | 11/1932 | Harney | 156—346 |

(Other references on following page)

UNITED STATES PATENTS

| | | | |
|---|---|---|---|
| 1,970,029 | 8/1934 | Brunner et al. | 156—40 X |
| 2,018,192 | 10/1935 | Sexton | 156—73 X |
| 2,200,155 | 5/1940 | Camp et al. | 156—43 |
| 2,749,263 | 6/1956 | Gibson | 156—40 X |
| 2,989,827 | 6/1961 | Groth | 156—285 |
| 3,017,305 | 1/1962 | Dailey | 156—40 |
| 3,047,447 | 7/1962 | Stasse | 156—40 |
| 3,054,714 | 9/1962 | Johnston | 156—212 |
| 3,083,756 | 4/1963 | Page et al. | 156—346 |

FOREIGN PATENTS

| | | |
|---|---|---|
| 1,207,354 | 8/1959 | France. |

EARL M. BERGERT, *Primary Examiner.*

MORRIS SUSSMAN, *Examiner.*